US011090994B2

(12) United States Patent
Matsumoto et al.

(10) Patent No.: US 11,090,994 B2
(45) Date of Patent: Aug. 17, 2021

(54) FRONT LOWER ARM

(71) Applicant: TOYOTA JIDOSHA KABUSHIKI KAISHA, Toyota (JP)

(72) Inventors: Shinpei Matsumoto, Nagoya (JP); Yukihiro Akiyama, Anjou (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 78 days.

(21) Appl. No.: 16/524,497

(22) Filed: Jul. 29, 2019

(65) Prior Publication Data
US 2020/0108681 A1  Apr. 9, 2020

(30) Foreign Application Priority Data
Oct. 5, 2018 (JP) .............................. JP2018-189713

(51) Int. Cl.
*B60G 7/00* (2006.01)

(52) U.S. Cl.
CPC ............ *B60G 7/001* (2013.01); *B60G 7/005* (2013.01); *B60G 7/008* (2013.01); *B60G 2204/148* (2013.01); *B60G 2204/416* (2013.01); *B60G 2206/012* (2013.01); *B60G 2206/124* (2013.01); *B60G 2206/81022* (2013.01); *B60G 2206/8201* (2013.01)

(58) Field of Classification Search
CPC ........ B60G 7/001; B60G 7/005; B60G 7/008; B60G 2204/416; B60G 2206/81022; B60G 2206/124; B60G 2206/012; B60G 2206/8201; B60G 2204/148; B60G 13/005; B60G 2204/129
See application file for complete search history.

(56) References Cited

U.S. PATENT DOCUMENTS

| 4,570,968 | A | * | 2/1986 | Mukai | ................... | B60G 7/001 |
| | | | | | | 280/124.145 |
| 7,571,918 | B2 | * | 8/2009 | Bowers | ................... | B60G 3/20 |
| | | | | | | 280/124.135 |
| 2009/0295113 | A1 | * | 12/2009 | Inoue | ................... | B60G 7/001 |
| | | | | | | 280/124.134 |
| 2010/0032920 | A1 | * | 2/2010 | Hong | ................... | B60G 15/068 |
| | | | | | | 280/124.109 |

(Continued)

FOREIGN PATENT DOCUMENTS

JP  2012-081915 A  4/2012
WO  2012/049857 A1  4/2012

*Primary Examiner* — Darlene P Condra
(74) *Attorney, Agent, or Firm* — Sughrue Mion, PLLC

(57) ABSTRACT

A front lower arm is tiltably supported, in a cantilever manner, by an outer surface of each of side-rails provided in right and left vehicle regions and extending in a vehicle front-rear direction. The front lower arm includes: a lower arm body; an inner pivot provided at an inner end of the lower arm body in a vehicle right-left direction and supported by the side-rail; and an attachment portion to which a lower end of a shock absorber is attached, and which is joined to an intermediate section of a front upper corner portion of the lower arm body. The intermediate section is an intermediate section of the front upper corner portion in the vehicle right-left direction. A ball joint to which a knuckle is connected is attached to an outer end of the front lower arm in the vehicle right-left direction.

3 Claims, 7 Drawing Sheets

(56) References Cited

U.S. PATENT DOCUMENTS

2010/0059945 A1* 3/2010 Kuwabara .............. B60G 7/001
                                                    280/29
2013/0168938 A1* 7/2013 Takanashi .............. B60G 99/00
                                                    280/124.1
2019/0152283 A1* 5/2019 Kwon ................... B29C 43/003

* cited by examiner

FRONT LOWER ARM

INCORPORATION BY REFERENCE

The disclosure of Japanese Patent Application No. 2018-189713 filed on Oct. 5, 2018 including the specification, drawings and abstract is incorporated herein by reference in its entirety.

BACKGROUND

1. Technical Field

The disclosure relates to a front lower arm.

2. Description of Related Art

For example, Japanese Patent No. 5698493 (JP 5698493 B) (Japanese Unexamined Patent Application Publication No. 2012-081915 (JP 2012-081915 A)) describes a vehicle suspension support structure in which a support bracket is welded to substantially the center portion of an upper surface of a lower arm and a lower end of a shock absorber is attached to the support bracket via a pivot shaft.

The support bracket is in the form of a quadrangular tube having a generally parallelogram shape as viewed from above. The support bracket includes a pair of upright plates having an elongated shape and facing each other. Outer end portions of the upright plates in the vehicle-width direction are bent so as to be in contact with each other. On the other hand, inner end portions of the upright plates in the vehicle-width direction are kept apart from each other.

SUMMARY

In JP 5698493 B (JP 2012-081915 A), the two upright plates of the support bracket are welded to the upper surface of the lower arm. Therefore, the upper surface of the lower arm may be deformed due to repeated loading associated with up-down motions of the shock absorber.

In JP 5698493 B (JP 2012-081915 A), portions of the upper surface of the lower arm, to which the inner end portions of the upright plates are welded, are located higher in the vehicle up-down direction than portions of the upper surface of the lower arm, to which the outer end portions of the upright plates are welded. For this reason, once moisture, such as water or muddy water, enters a space between the two upright plates, the moisture remains in the space without being discharged therefrom, and eventually, rust is formed in the upright plates and the portions of lower arm to which the upright plates are welded. Consequently, the load bearing property of the support bracket may deteriorate over time.

Alternatively, the support bracket may be welded to a side surface of the lower arm. In this case, a torsional stress may be generated in the lower arm due to repeated loading associated with up-down motions of the shock absorber. Therefore, the support stiffness of the lower arm, with which the lower arm supports the shock absorber, may become insufficient.

The disclosure provides a technology for improving the support stiffness with which a front lower arm supports a shock absorber.

An aspect of the disclosure relates to a front lower arm tiltably supported, in a cantilever manner, by an outer surface of each of side-rails respectively provided in right and left regions of a vehicle in a vehicle right-left direction and extending in a vehicle front-rear direction. The front lower arm includes a lower arm body, an inner pivot, and an attachment portion. The inner pivot is provided at an inner end of the lower arm body in the vehicle right-left direction. The inner pivot is supported by a corresponding one of the side-rails. A lower end of a shock absorber is attached to the attachment portion. The attachment portion is joined to an intermediate section of a front upper corner portion of the lower arm body. The front upper corner portion of the lower arm body is an upper corner portion at the front of the lower arm body in the vehicle front-rear direction. The intermediate section is an intermediate section of the front upper corner portion in the vehicle right-left direction. The front lower arm is configured such that a ball joint to which a knuckle is connected is attached to an outer end of the front lower arm in the vehicle right-left direction.

According to the foregoing aspect, in the front lower arm, the attachment portion for the shock absorber is joined to the front upper corner portion of the lower arm body having higher stiffness than that of an upper surface and a side surface of the lower arm body. For this reason, the load bearing properties of the attachment portion and the portion (the front upper corner portion) to which the attachment portion is joined are made higher than those in a case where the attachment portion is joined to the upper surface or the side surface of the front lower body.

Therefore, although repeated loading associated with up-down motions of the shock absorber is input into the attachment portion, it is possible to restrain or prevent deformation and breakage of the attachment portion and the portion (the front upper corner portion) to which the attachment portion is joined. As a result, the support stiffness of the front lower arm, with which the front lower arm supports the shock absorber, is improved.

In the front lower arm according to the foregoing aspect, the attachment portion may have a rectangular tubular shape. Further, the attachment portion may include a first wall, a second wall, a third wall, and a fourth wall that are arranged such that the first wall and the second wall face each other and extend in the vehicle right-left direction, the second wall is disposed rearward of the first wall in the vehicle front-rear direction, the third wall and the fourth wall face each other and extend in the vehicle front-rear direction, and the fourth wall is disposed inward of the third wall in the vehicle right-left direction. Furthermore, at least a lower end portion of the second wall, a lower end portion of the third wall, and a lower end portion of the fourth wall may be joined to the front upper corner portion. Moreover, at least one of the first wall and the second wall may be provided with a drainage path.

With this configuration, even if moisture, such as water or muddy water, enters the internal space of the attachment portion having a rectangular tubular shape, the moisture is discharged out of the internal space through the drainage path. Thus, the drainage property is improved. In this way, the rust resistance of the attachment portion and the portion to which the attachment portion is attached is improved.

The front lower arm according to the foregoing aspect may further include a ball joint bracket to which the ball joint is attached and which is joined, by welding, to an outer end of the lower arm body in the vehicle right-left direction. The lower arm body may be formed in a box shape by assembling together an upper plate member and a lower plate member, and an outer side portion of the lower arm body in the vehicle right-left direction may be provided with an opening. The ball joint bracket may be a forged product. An inner end portion of the ball joint bracket in the vehicle right-left direction may have such an outer shape that the inner end portion of the ball joint bracket is fitted in the opening of the lower arm body. The lower arm body and the ball joint bracket may be joined to each other by inserting the inner end portion of the ball joint bracket into the opening of the lower arm body and welding an outer periphery of the inner end portion of the ball joint bracket to an end face of the lower arm body, which defines the opening of the lower arm body.

With this configuration, it is possible to secure a sufficient stiffness of the lower arm body while keeping the lower arm body lightweight. Further, the ball joint bracket is a forged product having a high stiffness, and the total length of a welded junction between the ball joint bracket and the lower arm body is made as long as possible. As a result, the peeling resistance of the welded junction is improved.

According to the foregoing aspect, it is possible to improve the support stiffness with which the front lower arm supports the shock absorber. According to the foregoing aspect, the rust resistance of the attachment portion for the shock absorber and the portion to which the attachment portion is attached is improved.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

Hereinafter, an example embodiment will be described in detail with reference to the accompanying drawings.

The following description will be provided on the precondition that a vehicle in the embodiment includes at least right and left side-rails, right and left front suspension systems, and a vehicle cabin (an occupant compartment defining member). The right and left side-rails are respectively provided in the right and left regions of the vehicle in the vehicle right-left direction (i.e., the vehicle-width direction). The right and left side-rails extend in the vehicle front-rear direction (i.e., the vehicle-longitudinal direction).

In the embodiment illustrated in FIG. 1 to FIG. 7, only a front right section of the vehicle is illustrated. Although not illustrated, the configuration of a front left section of the vehicle is basically the same as the configuration of the front right section of the vehicle.

Figure 6:
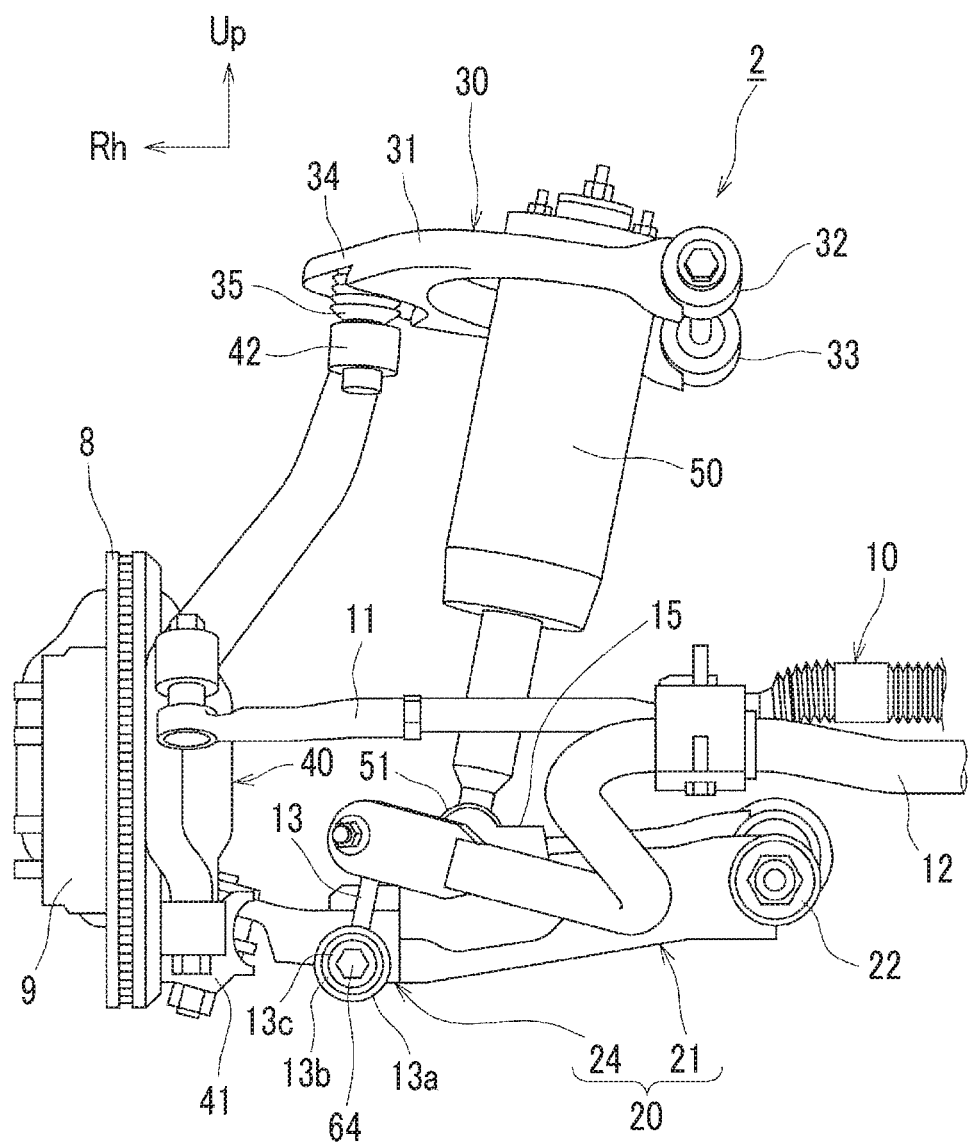
FIG. 6 is a view illustrating a front suspension system including the front lower arm illustrated in FIG. 1 to FIG. 5, as viewed from the front of a vehicle.
Figure 7:
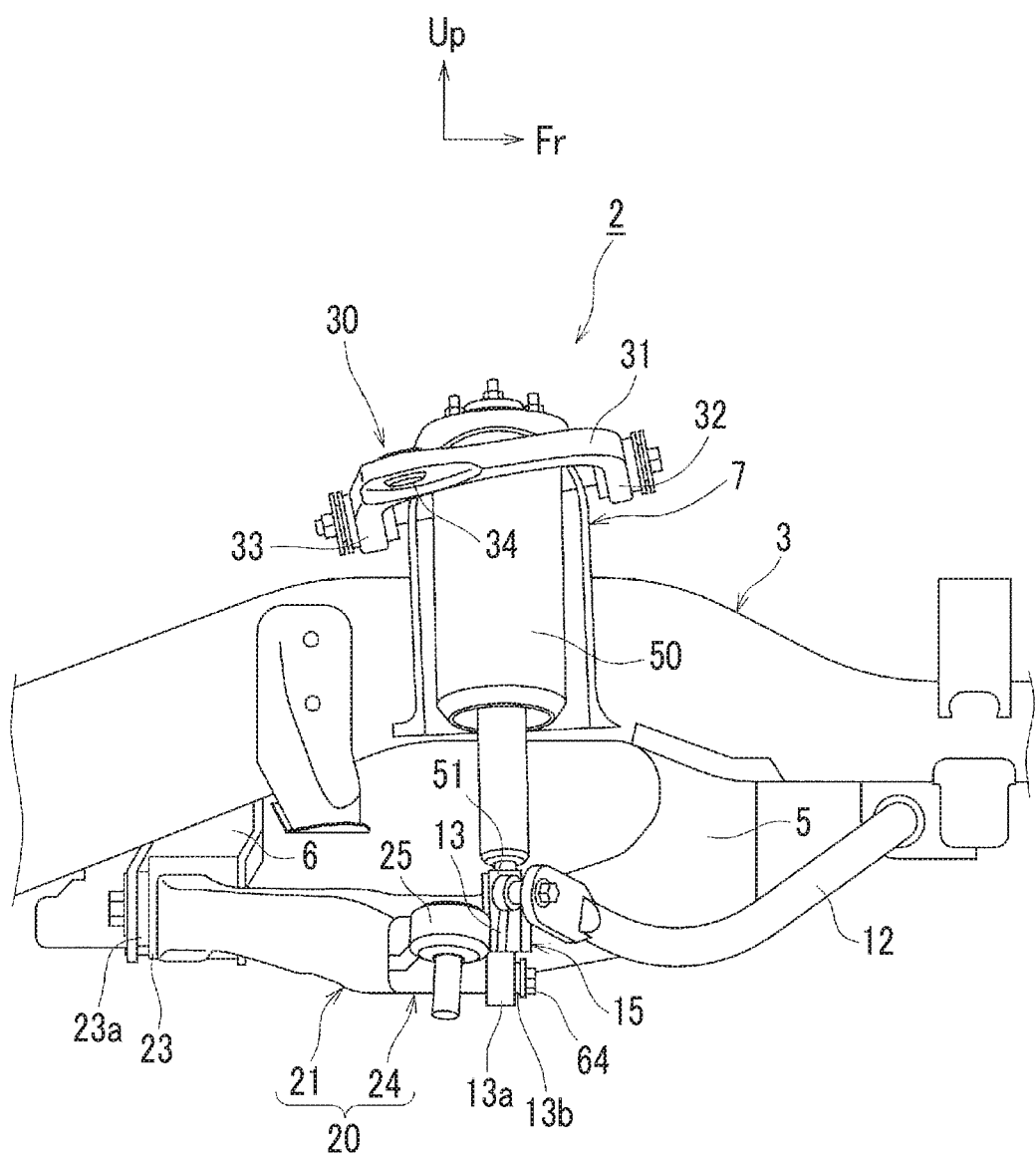
FIG. 7 is a view illustrating the front suspension system in FIG. 6, as viewed from the outside of the vehicle, in which illustration of a disc brake and a knuckle is omitted.

FIG. 6 and FIG. 7 illustrates a right front suspension system 2 (hereinafter, simply referred to as "front suspension system 2" where appropriate) and a right side-rail 3 (hereinafter, simply referred to as "side-rail 3" where appropriate).

Two cross-members, that is, a front cross-member 5 and a rear cross-member 6 (refer to FIG. 7) extend in the vehicle right-left direction. The front cross-member 5 and the rear cross-member 6 extend between the right side-rail 3 and a left side-rail (not illustrated). The front cross-member 5 and the rear cross-member 6 are arranged parallel to each other in the vehicle front-rear direction with a space left therebetween.

As illustrated in FIG. 6 and FIG. 7, the front suspension system 2 has a double wishbone structure of a high-mounted upper arm type, and includes a front lower arm 20, a front upper arm 30, a knuckle 40, a shock absorber 50, and so forth.

The front lower arm 20 is tiltably supported, in a cantilever manner, by an outer surface of the side-rail 3 such that the front lower arm 20 extends outward in the vehicle right-left direction. The front lower arm 20 includes a lower arm body 21, two inner pivots, that is, a front inner pivot 22 and a rear inner pivot 23, and a ball joint bracket 24, as illustrated in FIG. 1 and FIG. 2.

Figure 1:
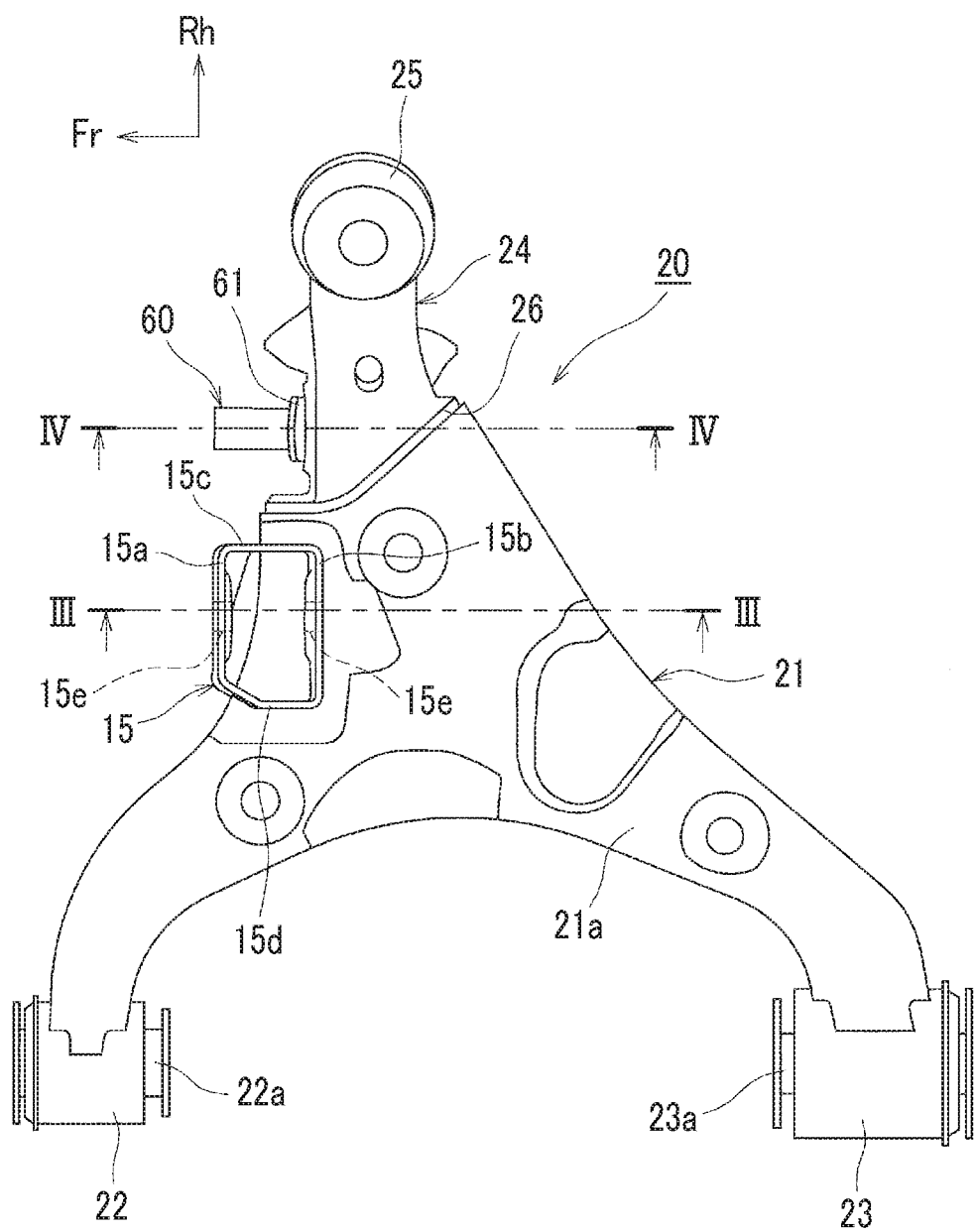
FIG. 1 is a plan view illustrating a front lower arm according to an embodiment.
Figure 2:
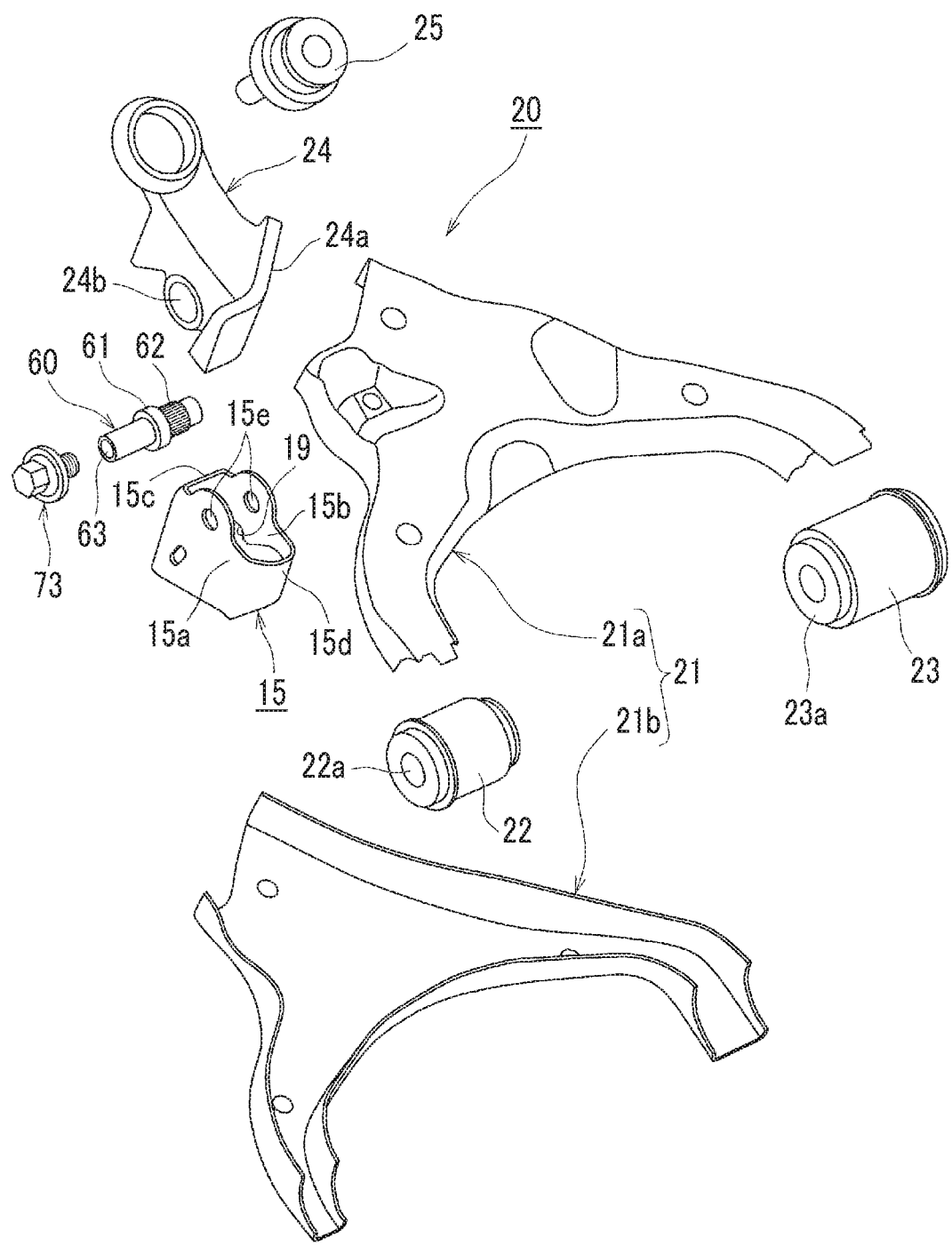
FIG. 2 is an exploded perspective view of the front lower arm of FIG. 1.

As illustrated in FIG. 1, the lower arm body 21 has a generally triangular shape and the width of the lower arm body 21 gradually decreases from the side-rail 3 side outward in the vehicle right-left direction, in a plan view.

Each of the front inner pivot 22 and the rear inner pivot 23 has a cylindrical shape. The front inner pivot 22 and the rear inner pivot 23 are respectively welded to two branch portions of the lower arm body 21. The lower arm body 21 is bifurcated into the two branch portions that are inner portions of the lower arm body 21 in the vehicle right-left direction.

The front inner pivot 22 is supported by the front cross-member 5 fixed to the side-rail 3, via a bushing 22a and a support pin (not illustrated). The rear inner pivot 23 is supported by the rear cross-member 6 fixed to the side-rail 3, via a bushing 23a and a support pin (not illustrated).

As described above, in the present embodiment, the front inner pivot 22 is indirectly supported by the side-rail 3, that is, the front inner pivot 22 is supported by the side-rail 3 via the front cross-member 5. Similarly, the rear inner pivot 23 is indirectly supported by the side-rail 3, that is, the rear inner pivot 23 is supported by the side-rail 3 via the rear cross-member 6.

The ball joint bracket 24 is a high-stiffness forged product to be welded to the lower arm body 21, and a ball joint 25 is attached to the ball joint bracket 24. A lower connection portion 41 of the knuckle 40 is connected to the ball joint 25.

The front upper arm 30 is tiltably supported, in a cantilever manner, by a tower part 7 fixed to the side-rail 3, such that the front upper arm 30 extends outward in the vehicle right-left direction. The front upper arm 30 includes an upper arm body 31, two inner pivots, that is, a front inner pivot 32 and a rear inner pivot 33, and a ball joint attachment portion 34.

The upper arm body 31 has a U-shaped one-piece structure in a plan view. Each of the front inner pivot 32 and the rear inner pivot 33 has a cylindrical shape. The front inner pivot 32 and the rear inner pivot 33 are respectively integral with two branch portions of the upper arm body 31. The upper arm body 31 is bifurcated into the two branch portions that are inner portions of the upper arm body 31 in the vehicle right-left direction.

Each of the front inner pivot 32 and the rear inner pivot 33 is supported by the tower part 7 via a bushing (not illustrated) and a support pin (not illustrated), as illustrated in FIG. 6.

The ball joint attachment portion 34 includes a through-hole provided in the upper arm body 31, and a ball joint 35 is attached to the ball joint attachment portion 34. An upper connection portion 42 of the knuckle 40 is connected to the ball joint 35.

A front disc brake 8 and a hub 9 are rotatably supported by the knuckle 40. A front wheel 1 (not illustrated) is attached to the hub 9. The knuckle 40 includes the lower connection portion 41 to which the ball joint bracket 24 of the front lower arm 20 is connected, and the upper connection portion 42 to which the ball joint 35 of the front upper arm 30 is connected.

A power steering apparatus 10 that operates in response to an operation of a steering wheel is connected to the knuckle 40 via a tie rod 11. A stabilizer link 13 at one end (in the drawing, a right end) of a stabilizer 12 is attached to a support shaft member 60 for the front lower arm 20.

The support shaft member 60 is provided so as to protrude further forward in the vehicle front-rear direction than the ball joint bracket 24.

A ridge portion 61 protruding radially outward is provided at an axially-intermediate portion of the support shaft member 60. Spline teeth 62 are provided on an outer peripheral surface of a first axial end portion of the support shaft member 60. An internally threaded hole 63 is provided inside a second axial end portion of the support shaft member 60. The first axial end portion of the support shaft member 60 is closer, in the axial direction, to a first end of the support shaft member 60 than the ridge portion 61 is. The second axial end portion of the support shaft member 60 is closer, in the axial direction, to a second end of the support shaft member 60 than the ridge portion 61 is.

An upper end of the shock absorber 50 is supported by the tower part 7, and a lower end of the shock absorber 50 is supported by a shock absorber bracket 15 (described later) (an example of "attachment portion") of the front lower arm 20.

A cylindrical portion 51 is provided at the lower end of the shock absorber 50, and a collar 53 having a cylindrical shape is provided radially inward of the cylindrical portion 51 via a bushing 52.

The cylindrical portion 51 of the shock absorber 50 is supported by the shock absorber bracket 15 of the front lower arm 20 via a bolt 16 and a nut 17.

The shock absorber bracket 15 is attached to a front upper corner portion of the lower arm body 21 of the front lower arm 20. The front upper corner portion of the lower arm body 21 is an upper corner portion at the front of the lower arm body 21 in the vehicle front-rear direction. More specifically, the shock absorber bracket 15 is attached to an intermediate section (a section located inward of the support shaft member 60 in the vehicle right-left direction) of the front upper corner portion in the vehicle right-left direction. Hereafter, the front upper corner portion in the vehicle front-rear direction will be simply referred to as "front upper corner portion".

The shock absorber bracket 15 has a rectangular tubular shape, and the shock absorber bracket 15 includes four walls. The four walls are a first wall 15a, a second wall 15b, a third wall 15c, and a fourth wall 15d. The first wall 15a and the second wall 15b face each other and extend in the vehicle right-left direction. The third wall 15c and the fourth wall 15d face each other and extend in the vehicle front-rear direction.

In the following description, the first wall 15a disposed forward of the second wall 15b in the vehicle front-rear direction will be referred to as "front wall", and the second wall 15b disposed rearward of the first wall 15a in the vehicle front-rear direction will be referred to as "rear wall". The third wall 15c disposed outward of the fourth wall 15d in the vehicle right-left direction will be referred to as "outer wall", and the fourth wall 15d disposed inward of the third wall 15c in the vehicle right-left direction will be referred to as "inner wall".

A lower opening end of the shock absorber bracket 15 is joined to the lower arm body 21 by welding or the like. Specifically, a lower end portion of the rear wall 15b and a lower end portion of each of the outer wall 15c and the inner wall 15d are joined to the front upper corner portion of the lower arm body 21.

Figure 3:
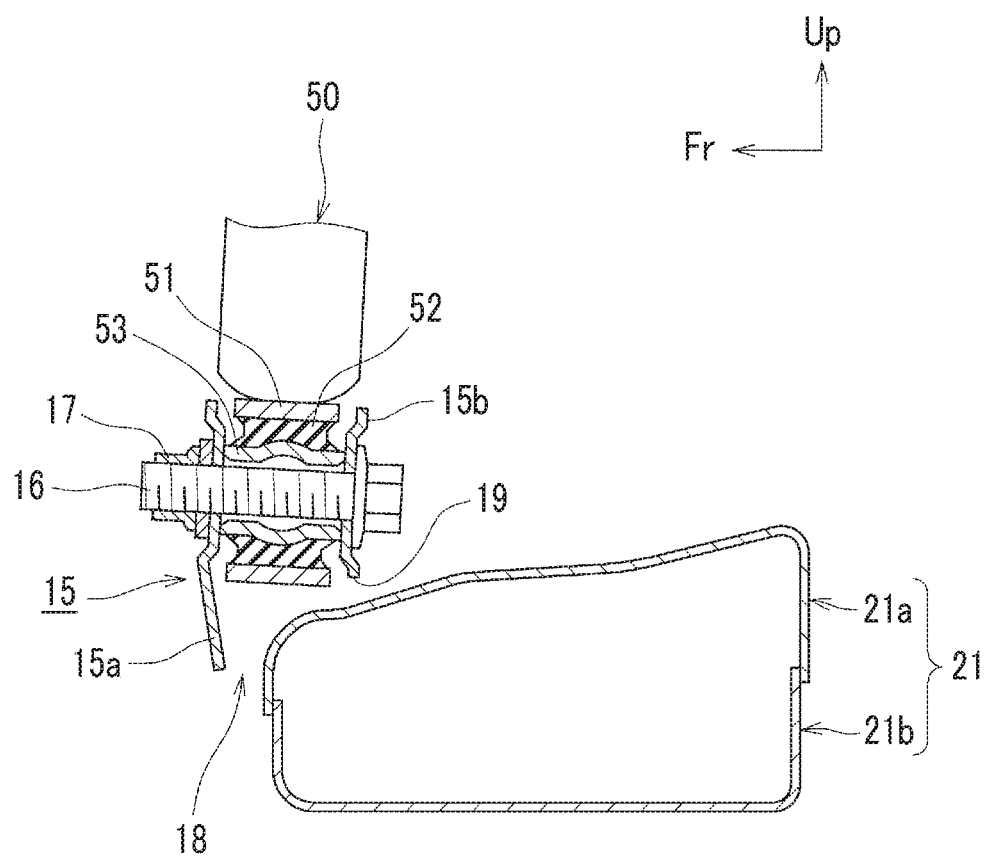
FIG. 3 is a sectional view taken along line III-III in FIG. 1 and viewed from the direction of arrows.

The front wall 15a of the shock absorber bracket 15 is disposed forward of the front upper corner portion of the lower arm body 21 in the vehicle front-rear direction, as illustrated in FIG. 1 and FIG. 3. Thus, an inner surface of the front wall 15a is spaced apart from the front upper corner portion of the lower arm body 21, so that the front wall 15a is not joined to the lower arm body 21.

Figure 5:
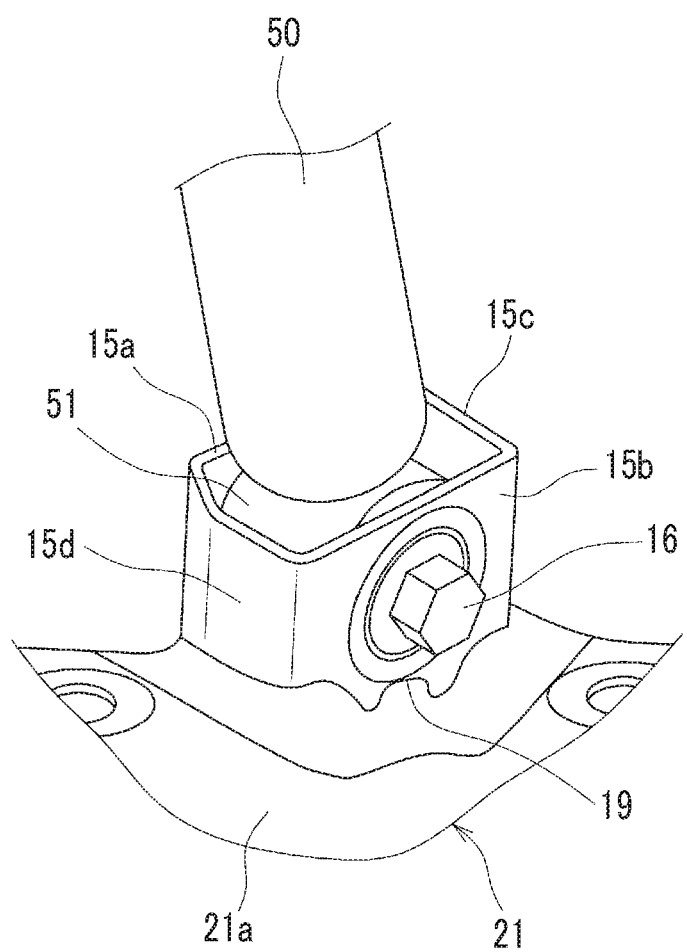
FIG. 5 is a view illustrating a rear wall of a shock absorber bracket in FIG. 1.

The space left between the front wall 15a of the shock absorber bracket 15 and the front upper corner portion of the lower arm body 21 will be referred to as a space 18. A cutout (recess) 19 is provided in a lower end portion of the rear wall 15b, as illustrated in FIG. 5. Each of the space 18 and the cutout 19 is an example of "drainage path".

The internal space of the shock absorber bracket 15 having a rectangular tubular shape has such a size that the cylindrical portion 51 at the lower end of the shock absorber 50 can be fitted in the internal space.

Through-holes 15e, through which the bolt 16 is passed, are respectively provided in the front wall 15a and the rear wall 15b of the shock absorber bracket 15.

Next, a manner of joining together the lower arm body 21 of the front lower arm 20 and the ball joint bracket 24 of the front lower arm 20 will be described in detail.

In order to secure a required stiffness of the lower arm body 21 while keeping the lower arm body 21 lightweight, the lower arm body 21 is formed in a box shape by assembling together an upper plate member 21a and a lower plate member 21b both of which are made of press-molded metal, as illustrated in FIG. 2 and FIG. 3.

An outer side portion of the lower arm body 21 in the vehicle right-left direction is provided with an opening. Hereafter, the opening at the outer side portion will be referred to as an outer opening.

The ball joint bracket 24 is a high-stiffness forged product. An inner end portion 24a of the ball joint bracket 24 in the vehicle right-left direction is fitted into the outer opening of the lower arm body 21, and is then fixed to the lower arm body 21 by welding.

Figure 4:
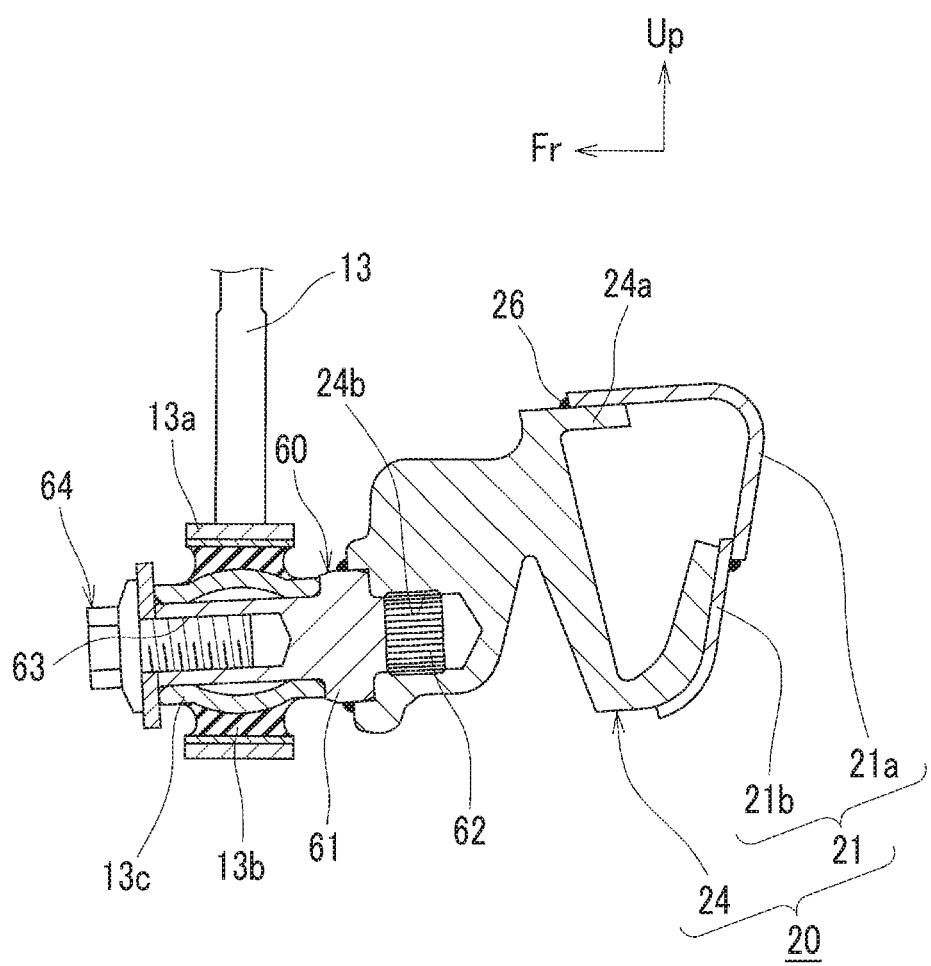
FIG. 4 is a sectional view taken along line IV-IV in FIG. 1 and viewed from the direction of arrows.

Specifically, as illustrated in FIG. 4, the inner end portion 24a of the ball joint bracket 24 has such an outer shape that the inner end portion 24a is fitted into the outer opening of the lower arm body 21. An internal spline hole 24b is provided in a front side portion of the ball joint bracket 24 in the vehicle front-rear direction.

A welded junction 26 between the lower arm body 21 and the ball joint bracket 24 is formed in the following manner: the inner end portion 24a of the ball joint bracket 24 is fitted into the outer opening of the lower arm body 21, and then the outer periphery of the inner end portion 24a is welded to the end face of the lower arm body 21, which defines the outer opening.

As illustrated in FIG. 1, the welded junction 26 is inclined such that a rear portion of the welded junction 26 in the vehicle front-rear direction is located outward, in the vehicle right-left direction, of a front portion of the welded junction 26 in the vehicle front-rear direction, in a plan view.

Next, a manner of attaching the support shaft member 60 to the ball joint bracket 24 will be described in detail.

First, as illustrated in FIG. 4, the spline teeth 62 of the first axial end portion of the support shaft member 60 are spline-fitted into the internal spline hole 24b of the ball joint bracket 24. In this state, a junction between the ridge portion 61 of the support shaft member 60 and the opening end of the ball joint bracket 24, which defines the internal spline hole 24b, is welded together.

Then, a collar 13c of a cylindrical portion 13a at a lower end of the stabilizer link 13 is fitted to the support shaft member 60, and a bolt 64 is screwed into the internally threaded hole 63 of the support shaft member 60. As a result, the lower end of the stabilizer link 13 is fixed to the support shaft member 60.

When the support shaft member 60 is attached to the ball joint bracket 24 in this manner, an extension line of the central axis of the support shaft member 60 intersects with the welded junction 26 that is inclined (refer to FIG. 1).

In order to attach the stabilizer link 13 to the support shaft member 60, the cylindrical portion 13a of the stabilizer link 13 is fitted to the support shaft member 60 and then the bolt 64 is screwed into the internally threaded hole 63 of the support shaft member 60.

Next, in order to attach the lower end of the shock absorber 50 to the shock absorber bracket 15, the cylindrical portion 51 of the shock absorber 50 is fitted into the space between the front wall 15a and the rear wall 15b of the shock absorber bracket 15, the bolt 16 is inserted through the center hole of the cylindrical portion 51 and the through-hole 15e of each of the front wall 15a and the rear wall 15b, and then the nut 17 is screwed to a distal end of a threaded shaft portion of the bolt 16, as illustrated in FIG. 3.

When the collar 53 is compressively deformed in the axial direction by increasing the extent to which the bolt 16 is tighten, the bushing 52 is expanded in the radial direction. In this way, it is possible to reduce or eliminate a gap between the cylindrical portion 51 of the shock absorber 50 and each of the front wall 15a and the rear wall 15b of the shock absorber bracket 15.

According to the embodiment described above, in the front lower arm 20, the shock absorber bracket 15 is joined to the front upper corner portion of the lower arm body 21 having higher stiffness than that of the upper surface and the side surface of the lower arm body 21. For this reason, the load bearing properties of the shock absorber bracket 15 and the portion (the front upper corner portion) to which the shock absorber bracket 15 is joined are made higher than those in a case where the shock absorber bracket 15 is joined to the upper surface or the side surface of the lower arm body 21.

Therefore, although repeated loading associated with up-down motions of the shock absorber 50 is input into the shock absorber bracket 15, it is possible to restrain or prevent deformation and breakage of the shock absorber bracket 15 and the portion (the front upper corner portion) to which the shock absorber bracket 15 is joined. As a result, the support stiffness of the front lower arm 20, with which the front lower arm 20 supports the shock absorber 50, is improved.

Even if moisture, such as water or muddy water, enters the internal space of the shock absorber bracket 15 having a rectangular tubular shape, the moisture is discharged out of the internal space through the space 18 and the cutout 19 for drainage. Thus, the drainage property is improved. In this way, it is possible to prevent formation of rust in the shock absorber bracket 15 or the portion to which the shock absorber bracket 15 is joined, so that the rust resistance is improved. As a result, the load bearing property of the shock absorber bracket 15 can be maintained over a long period of time.

According to the embodiment described above, the lower arm body 21 is formed in a box shape by assembling together the upper plate member 21a and the lower plate member 21b both of which are made of press-molded metal. Therefore, it is possible to secure a sufficient stiffness of the lower arm body 21 while keeping the lower arm body 21 lightweight. Further, the ball joint bracket 24 is a forged product having a high stiffness, and the total length of the welded junction between the ball joint bracket 24 and the lower arm body 21 is made as long as possible. As a result, the peeling resistance of the welded junction is improved.

The disclosure is not limited to the foregoing embodiment. The technical scope of the disclosure is defined by claims, and all changes which come within the meaning and range of equivalency of the claims are therefore intended to be embraced therein.

(1) In the foregoing embodiment, the space 18 and the cutout 19 for drainage are provided in the shock absorber bracket 15. However, the configuration of the present disclosure is not limited to this.

Although not illustrated in the drawings, for example, a configuration in which neither the space 18 nor the cutout 19 for drainage is provided and a configuration in which only one of the space 18 and the cutout 19 for drainage is provided in the foregoing embodiment are also included in the disclosure.

(2) In the foregoing embodiment, the lower arm body 21 of the front lower arm 20 is formed by combining together the upper plate member 21a and the lower plate member 21b. However, the configuration of the present disclosure is not limited to this. Although not illustrated in the drawings, for example, a configuration in which the lower arm body 21 has a one-piece structure is also included in the disclosure.

(3) In the foregoing embodiment, the front lower arm 20 is indirectly supported by the side-rail 3, that is, the front lower arm 20 is supported by the side-rail 3 via the front cross-member 5 and the rear cross-member 6. However, the configuration of the present disclosure is not limited to this. Although not illustrated in the drawings, for example, a configuration in which the front lower arm 20 is directly supported by the side-rail 3 is also included in the disclosure.

The disclosure is applicable to a front lower arm.

What is claimed is:

1. A front lower arm tiltably supported, in a cantilever manner, by an outer surface of each of side-rails respectively provided in right and left regions of a vehicle in a vehicle right-left direction, the side-rails extending in a vehicle front-rear direction, the front lower arm comprising:
  a lower arm body;
  an inner pivot provided at an inner end of the lower arm body in the vehicle right-left direction, the inner pivot being supported by a corresponding one of the side-rails; and
  an attachment portion to which a lower end of a shock absorber is attached, the attachment portion being joined to an intermediate section of a front upper corner portion of the lower arm body, the front upper corner portion of the lower arm body being an upper corner portion at a front of the lower arm body in the vehicle front-rear direction, and the intermediate section being an intermediate section of the front upper corner portion in the vehicle right-left direction, wherein the front lower arm is configured such that a ball joint to which a knuckle is connected is attached to an outer end of the front lower arm in the vehicle right-left direction, the attachment portion has a rectangular tubular shape and includes a first wall, a second wall, a third wall, and a fourth wall, the first wall and the second wall facing each other and extending in the vehicle right-left direction, the second wall being disposed rearward of the first wall in the vehicle front-rear direction, the third wall and the fourth wall facing each other and extending in the vehicle front-rear direction, and the fourth wall being disposed inward of the third wall in the vehicle right-left direction, the first wall is disposed forward of the front upper corner portion of the lower arm body in the vehicle front-rear direction such that the first wall is spaced apart from the front upper corner portion.

2. The front lower arm according to claim 1, wherein:

at least a lower end portion of the second wall, a lower end portion of the third wall, and a lower end portion of the fourth wall are joined to the front upper corner portion; and a lower end portion of the second wall is provided with a cutout.

3. The front lower arm according to claim 1, further comprising a ball joint bracket to which the ball joint is attached, the ball joint bracket being joined, by welding, to an outer end of the lower arm body in the vehicle right-left direction, wherein the lower arm body is formed in a box shape by assembling together an upper plate member and a lower plate member, and an outer side portion of the lower arm body in the vehicle right-left direction is provided with an opening, the ball joint bracket is a forged product, an inner end portion of the ball joint bracket in the vehicle right-left direction has such an outer shape that the inner end portion of the ball joint bracket is fitted in the opening of the lower arm body, and the lower arm body and the ball joint bracket are joined to each other by inserting the inner end portion of the ball joint bracket into the opening of the lower arm body and welding an outer periphery of the inner end portion of the ball joint bracket to an end face of the lower arm body, which defines the opening of the lower arm body.

* * * * *